June 12, 1923.  1,458,140

W. A. LEWIS

AUTO HEADLIGHT WRENCH

Filed July 24, 1922

Inventor:
Wm A. Lewis
By Howard Swartz Aty

Patented June 12, 1923.

1,458,140

UNITED STATES PATENT OFFICE.

WILLIAM A. LEWIS, OF WOOSTER, OHIO.

AUTO HEADLIGHT WRENCH.

Application filed July 24, 1922. Serial No. 577,228.

*To all whom it may concern:*

Be it known that I, WILLIAM A. LEWIS, a citizen of the United States, residing at Wooster, in the county of Wayne and State of Ohio, have invented a new and useful Auto Headlight Wrench, of which the following is a specification.

My invention relates to devices for detaching and re-placing the covering for the headlight of automobiles and other vehicles on which headlights are mounted, and may be described as a suitable wrench for the purpose, and is applicable to all such head-lights as have a glass cover with a rim around the margin thereof adapted to engage the periphery of the body, and particularly such as require the rim to be rotated thereon to fasten and unfasten the same.

Its principal object is to provide a simple, and efficient device for turning the rim upon the periphery of the body member of the ordinary headlight, whereby the glass cover may be readily removed or mounted without marring the engaging parts, or the use of tools as heretofore.

It consists of an appliance comprising a circular band of resilient metal shaped and adapted to surround the rim of the glass of the head-light, and to be capable of tightly clasping the circumference of the rim, and means for rotating the rim manually while clasped as aforesaid, and means for readily unclasping the rim by enlarging the circumference of the wrench, as hereinafter fully set forth and stated in the appended claim.

My invention is illustrated by the accompanying drawings in which similar letters and figures of reference indicate like parts.

Figure 1:
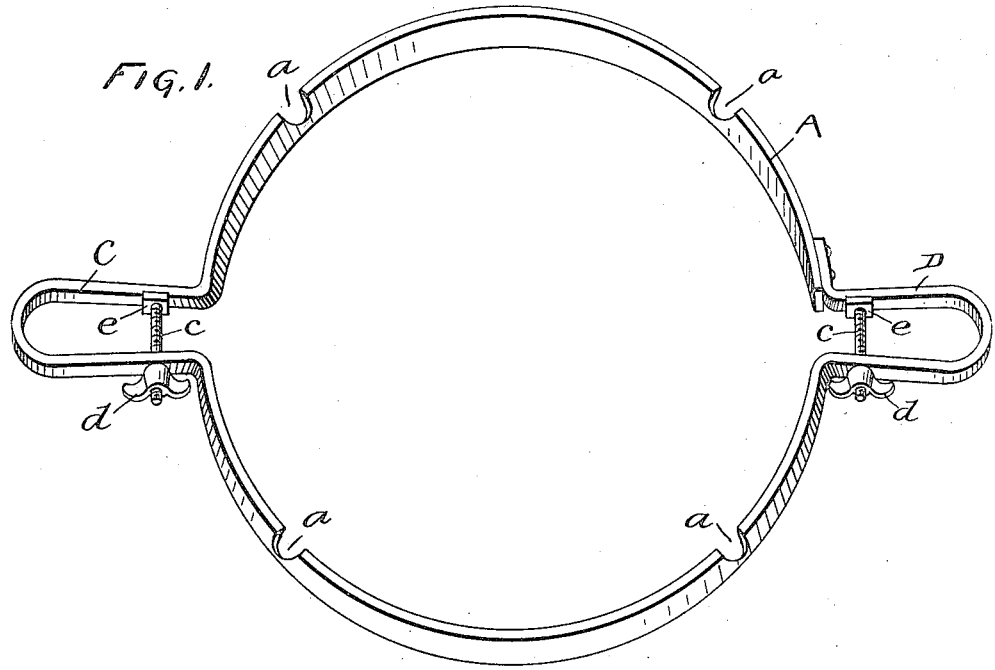
Figure 2:
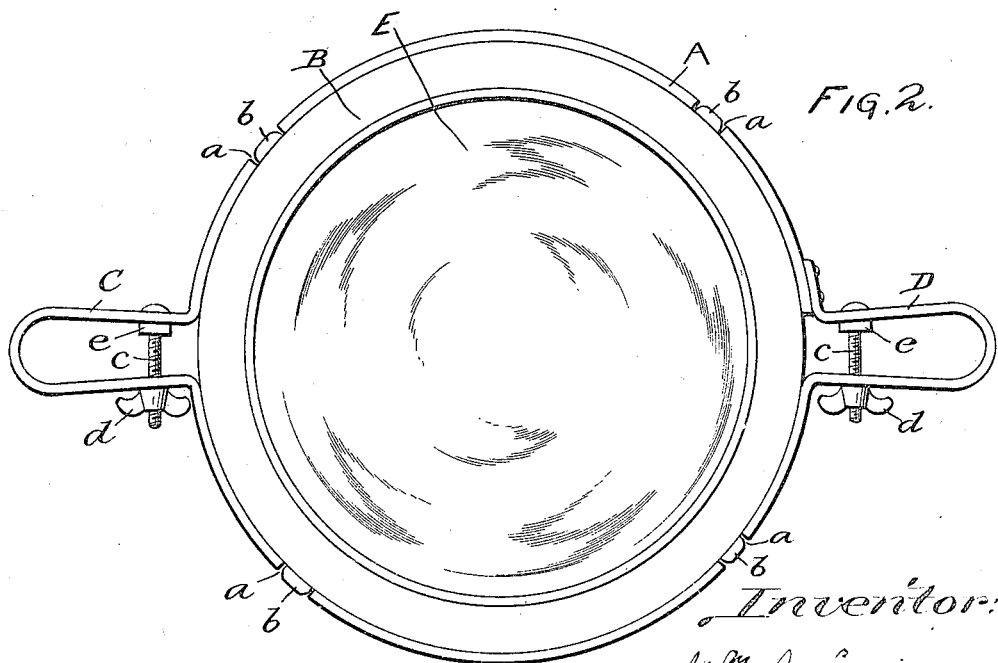

Referring thereto, Fig. 1 is a perspective view of my clasping and un-clasping wrench, and Fig. 2 is a plan view of the same mounted upon the rim of an ordinary head-light glass as commonly used in automobiles. In the drawings, A is the body or band of my head-light wrench; B is the rim for the head-light glass E; and C, D are duplicate handles projecting outwardly from opposite sides of the band A, each handle comprising two spaced apart members, about parallel to each other, terminating in a resilient bend which unites them, and said members adapted to be drawn towards each other by means of thumb-nutted bolts c, c, respectively, and to spread apart resiliently when the nuts d, d, are loosened.

To accommodate bolt heads which project from the rim (b, b, b, b,) the band is suitably notched, as at a, a, a, a, to admit the same and to allow the band to rest down upon the rim, and the notches also serve as additional means for rotating the rim. As rotatable rims are sometimes constructed without such projecting bolt heads, the notches may be omitted, and they are not absolutely essential to my device in all cases, and their omission is not a departure therefrom.

Experience has demonstrated the necessity of having a pair of handles, as C, and D, one opposite the other, projecting outwardly from the band A, in order that the band may be rotated by both hands of the operator by an even pressure on both sides of the head-light, and be easily adjustable thereon for turning the glass rim on and off when necessary, by tightening or loosening the band of the wrench thereon, and turning evenly, as aforesaid.

The band A is preferably made of one piece of strap metal resilient from end to end, and the meeting ends riveted together in any suitable manner.

By the means set forth, it is apparent the circular band A may be readily adjusted upon the rim of the head-light glass, and tightened thereon so as not to slip, and manually rotated in both directions by the handles C and D, and the glass cover with the rim may be removed from the body of the head-light, and held within and by said band A for convenience during the operation.

I am aware it is not new to construct wrenches for somewhat similar purposes, having a pair of circular jaws hinged together and actuated by a lever, to seal and remove fruit jar caps and the like; also to construct plate lifters and the like by means of an endless resilient band mounted thereon, and such I do not broadly claim. But having thus fully described my invention what I claim as new and desire to secure by Letters Patent is—

An auto-headlight wrench, comprising in combination, a pair of opposite semi-circular bands adjacent to each other; a pair of handles opposite each other on said bands; said handles projecting outwardly from the adjacent terminals of said bands, respectively; each handle comprising a pair of slightly spaced apart resilient members which unite outwardly in a bend thereof, and are inwardly joined to the adjacent terminals of said bands, respectively; and means for positively drawing said spaced apart members toward each other, and means for relaxing them by their resilience, substantially as set forth.

In witness whereof, I hereunto set my hand this 20 day of May, A. D. 1922.

WILLIAM A. LEWIS.

In presence of two witnesses—
HIRAM B. SWARTZ,
WALTER J. MOUGEY.